United States Patent [19]
Fisher

[11] 3,893,658
[45] July 8, 1975

[54] MULTIPLE GAS FEED ROTARY JOINT FOR METALLURGICAL VESSELS

[75] Inventor: Howard M. Fisher, New Castle, Pa.

[73] Assignee: Pennsylvania Engineering Corporation, Pittsburgh, Pa.

[22] Filed: Feb. 15, 1973

[21] Appl. No.: 332,650

Related U.S. Application Data

[63] Continuation-in-part of Ser. No. 213,386, Dec. 29, 1971, abandoned.

[52] U.S. Cl............................................. 266/36 P
[51] Int. Cl.............................................. C21c 5/46
[58] Field of Search............ 266/35, 36 P, 36 H, 41; 285/134, 165, 187, 190, 275, 302, 351

[56] References Cited
UNITED STATES PATENTS

| | | | |
|---|---|---|---|
| 741,505 | 10/1903 | Kirk.................................. | 266/36 P |
| 2,325,464 | 7/1943 | Bannister............................ | 285/190 |
| 2,641,461 | 6/1953 | Lewis................................. | 266/36 P |
| 3,330,645 | 7/1967 | De Moustier et al............. | 266/35 X |
| 3,795,389 | 3/1974 | Kennedy.............................. | 266/36 P |

FOREIGN PATENTS OR APPLICATIONS

| 891,547 | 3/1962 | United Kingdom............... 266/36 P |
|---|---|---|

Primary Examiner—Gerald A. Dost
Attorney, Agent, or Firm—Fred Wiviott

[57] ABSTRACT

A rotary joint is adapted for delivering a plurality of fluids through independent passageways in a shaft which supports a metallurgical vessel for tilting. In one embodiment there is a central tubular element that connects to one passageway and another surrounding coaxial hollow element which connects with another passageway. The central tubular element is connected to one fluid source and the surrounding coaxial hollow element connects to another. The hollow element in one embodiment has a part which turns on the vessel axis and another part which is stationary and sealed with respect to the tubular element. The stationary part connects to the second source of fluid which may be a gas or gas containing entrained finely divided materials. When the joint is used to deliver different fluids which may react with each other, a detection device responsive to any leakage of fluid from the relatively movable parts is provided to automatically turn off one fluid supply or another to prevent intermixture of the fluids and thus forestall the danger of explosion or combustion. In an alternative form, the joint is adapted for delivering a fluid such as cooling water through one passageway along with a gas supplied to another passageway while simultaneously removing heated cooling water from another passageway.

35 Claims, 9 Drawing Figures

FIG. 3

INVENTOR
HOWARD M. FISHER

MULTIPLE GAS FEED ROTARY JOINT FOR METALLURGICAL VESSELS

CROSS REFERENCE TO RELATED APPLICATIONS

This is a continuation-in-part of application Ser. No. 213,386, filed Dec. 29, 1971, and now abandoned.

BACKGROUND OF THE INVENTION

This invention relates to metallurgical vessels and particularly to a rotary joint for supplying liquids, grases, finely divided materials jointly and separately to a vessel in which molten metal is treated. The rotary joint is applicable, for example, to vessels in which hot metal is converted to steel by the bottom-blown basic oxygen method and to vessels in which molten metal is treated with a mixture of argon and oxygen for bringing about desired metallurgical results. The joint may also be adapted to provide a source of cooling fluid to the trunnion ring or other supporting structure for the vessel. In general, the new rotary joint is adapted for use with metallurgical vessels that are mounted on shafts so that the vessel may be tilted or inverted.

A vessel which is adapted for converting hot metal to steel in accordance with the bottom-blown basic oxygen method will be used to explain one embodiment of the new rotary joint and an argon-oxygen treatment vessel will be used to explain another embodiment. A recent adaptation of the bottom-blown process involves charging the vessel with hot metal and scrap and injecting oxygen and finely divided materials such as fluxes into the melt through tuyeres in the bottom of the vessel. The finely divided materials are usually entrained in oxygen which reduces carbon and other impurities as it permeates the melt while the fluxes and other materials react to effectuate other aspects of refining the metal. In one advanced version of the bottom-blown process, a hydrocarbon gas such as propane is blown through tuyeres into the melt. The hydrocarbon cracks into its carbon and hydrogen constituents. This is an endothermic reaction which results in keeping the tuyeres and refractory lining cool, thus reducing thermal deterioration. In addtion to the injection of gases through the bottom of the vessel, gases such as oxygen or propane may also be introduced above the surface of the molten metal for such purposes as preheating the melt or to support combustion of the gases evolved from the melt as a result of the bottom gas injection.

Various types of rotary joints have been devised for connecting stationary sources of gas and finely divided materials or both to the rotatable trunnion shaft of the vessel support through which the gas is conducted to the tuyeres in the vessel bottom. Obviously, there is an ever present danger of oxygen and the hydrocarbon gas becoming intermixed exteriorly of the vessel due to a leak in the rotary joint, in which case a fire or explosion might occur. The present invention is concerned with minimizing the likelihood of gas intermixture occurring in connection with bottom-blown vessels and with using the basic principles of the invention in rotary joints for vessels in which noncombustible gases such as argon and oxygen are used to treat molten metal. The basic principles of the invention may also be applied to other uses such as an inlet for cooling water to the supporting trunnion ring of the vessel and as an outlet for the heated cooling fluid.

SUMMARY OF THE INVENTION

An object of the invention is to provide a reliable rotary joint for conducting different gases and gases together with finely divided materials to tiltable metallurgical vessels.

A further object of this invention is to provide a rotary joint for simultaneously conducting oxygen, finely divided materials and combustible gases to a vessel in such manner that if a leak should occur in the joint, a warning signal is given to the operator and the leaking gas will go into the atmosphere at a maximum distance from those parts of the assembly which carry other gases, thereby reducing gas concentration to a level which minimizes the chance of combustion occuring.

Yet another object of the invention is to dispose a gas leak detector means in proximity with rotary joints from which there is a probability of gas leaking and to provide means responding to the gas detector means for shutting off at least one gas supply line in the event of a leak.

Still another object of the invention is to provide a rotary joint for simultaneously conducting cooling fluid to the vessel support, exhausting heated coolant and conducting a gas such as oxygen or propane to the vessel.

How the foregoing and other more specific objects of the invention are achieved will appear in the course of a detailed description of a preferred embodiment of the invention which will be set forth hereinafter.

In general terms, the embodiment of the new rotary joint for use with oxygen converter vessels has a central tubular element connected to a gas passageway in a vessel trunnion shaft so that the tubular element rotates with the trunnion shaft when the vessel is tilted. Another hollow element surrounds the tubular element concentrically and connects to another passageway in the trunnion shaft. The hollow element has an inlet for gas such as oxygen in which finely divided material may be entrained. For the sake of brevity, finely divided material will be referred to hereinafter as powdered material but the latter term is intended to encompass granular materials as well as materials which are fine enough to be called powder. A rotatable seal between the tubular element and the hollow element and member is surrounded by a chamber in which there are gas detectors. The vessel remote end of the tubular element connects with a swivel joint which has an inlet for receiving gas from a source. The tubular element is encased by a concentric pipe which protects the tubular element from abrasion by the gas entrained powdered material. The gas detectors respond to leakage in certain rotatable seals and to the presence of gas resulting from perforation of the protective pipe by erosion, for example.

In the embodiment of the rotary joint used with argon-oxygen treatment vessels, two concentric pipes run into the end of a hollow trunnion shaft in which there are separate exit passages to the vessel. The pipes connect with a swivel assembly remote from the vessel which assembly has individual isolated rotary joints and individual gas inlets.

In the embodiment of the rotary joint used with an oxygen converter vessel having provisions for injection of gases over the top surface of the melt, three coaxial flow passages are provided for simultaneously conducting three different fluid streams to corresponding passageways in the trunnion pin. A rotary joint is provided on one trunnion pin for conducting cooling water into and out of the trunnion ring which supports the vessel. A separate passage is also provided in the joint for conducting a gas for injection into the vessel. Another rotary joint is used to conduct three separate gas streams.

Illustrative embodiments of the invention will now be described with reference to the drawings.

DESCRIPTION OF A PREFERRED EMBODIMENT

Figures 1, 2:
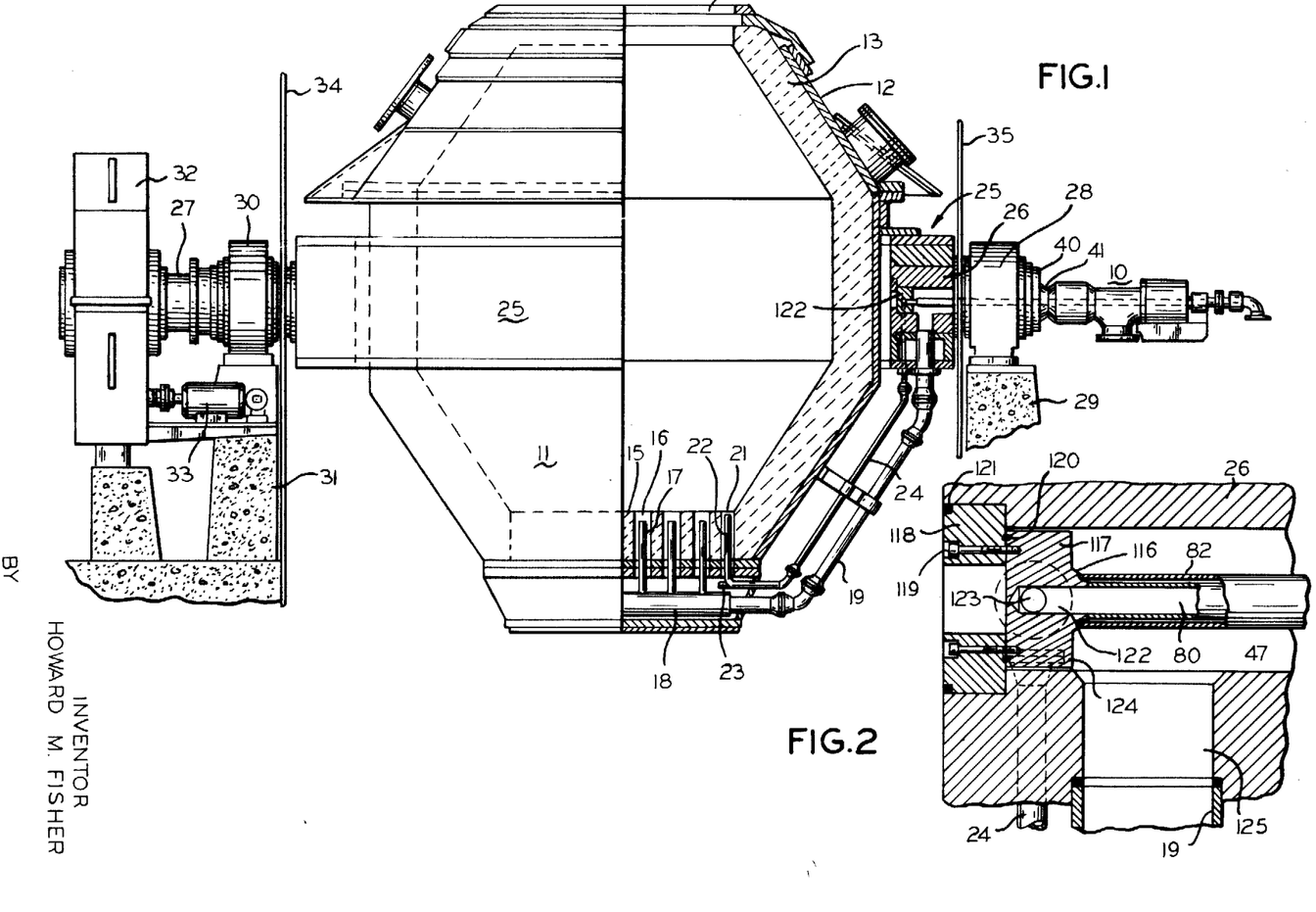
FIG. 1 is an elevational view, partly in section, of a metallurgical vessel to which the new rotary joint is applied.
FIG. 2 is a fragment of a portion of the assembly in the preceding figure which is isolated and enlarged for the sake of clarity.

In FIG. 1 the new rotary joint assembly is generally designated by the reference numeral 10 and is shown affiliated with a converter vessel 11 which is partially in section. The vessel is conventional in the respect that it has a metal shell 12 and an interior refractory lining 13 about its insides and bottom and a top opening 14 for charging with hot metal and scrap. The vessel bottom 15 has a plurality of tuyeres 16 into which nozzles such as 17 project. The nozzles emanate from a header 18 which may be a hollow cylinder. The header 18 is supplied through a pipe assembly 19 with a pressurized gas, usually oxygen, in which powdered materials such as fluorspar, lime, iron ore and other materials used for refining steel are entrained. These materials are injected into the bottom of the melt in vessel 11 during the refining process and effectuate certain reactions which contribute toward making steel of desired specifications as is well known.

A hydrocarbon gas such as propane may also be injected through the bottom of vessel 11 concurrently with the injection of oxygen in which powdered material is entrained during the refining process. For this purpose an array of tuyeres 21 are provided. These tuyeres have nozzles such as 22 for injecting the hydrocarbon gas into the melt. The nozzles may connect with a header 23, shown fragmentarily, to which a feed pipe 24 is connected. Both gas feed pipes 19 and 24 lead back to the trunnion shaft in a trunnion ring which is generally designated 25. The trunnion shaft has suitable passageways for conducting the gases in isolation from each other and cooperates with the new rotary joint as will be explained in greater detail later. Vessel 11 is supported within trunnion ring 25 from which opposite trunnion shafts 26 and 27 extend. Shaft 26 is journaled in a bearing structure 28 which is in turn supported on a concrete pedestal 29 in a conventional manner. The other trunnion shaft 27 is journaled in a bearing 30 which is supported on a pedestal 31. Shaft 27 extends into a gear housing 32. The gear train, not shown, in the housing 32 is coupled with a reversible motor 33. Motor rotation will, of course, exert torque on trunnion shaft 27 and cause trunnion ring 25 and the vessel to tilt in either selected direction in a well-known fashion and for well-known purposes. Converter vessels such as the one here under consideration are usually surrounded by splash guards which are marked 34 and 35 in this example and are shown fragmentarily.

Figure 3:
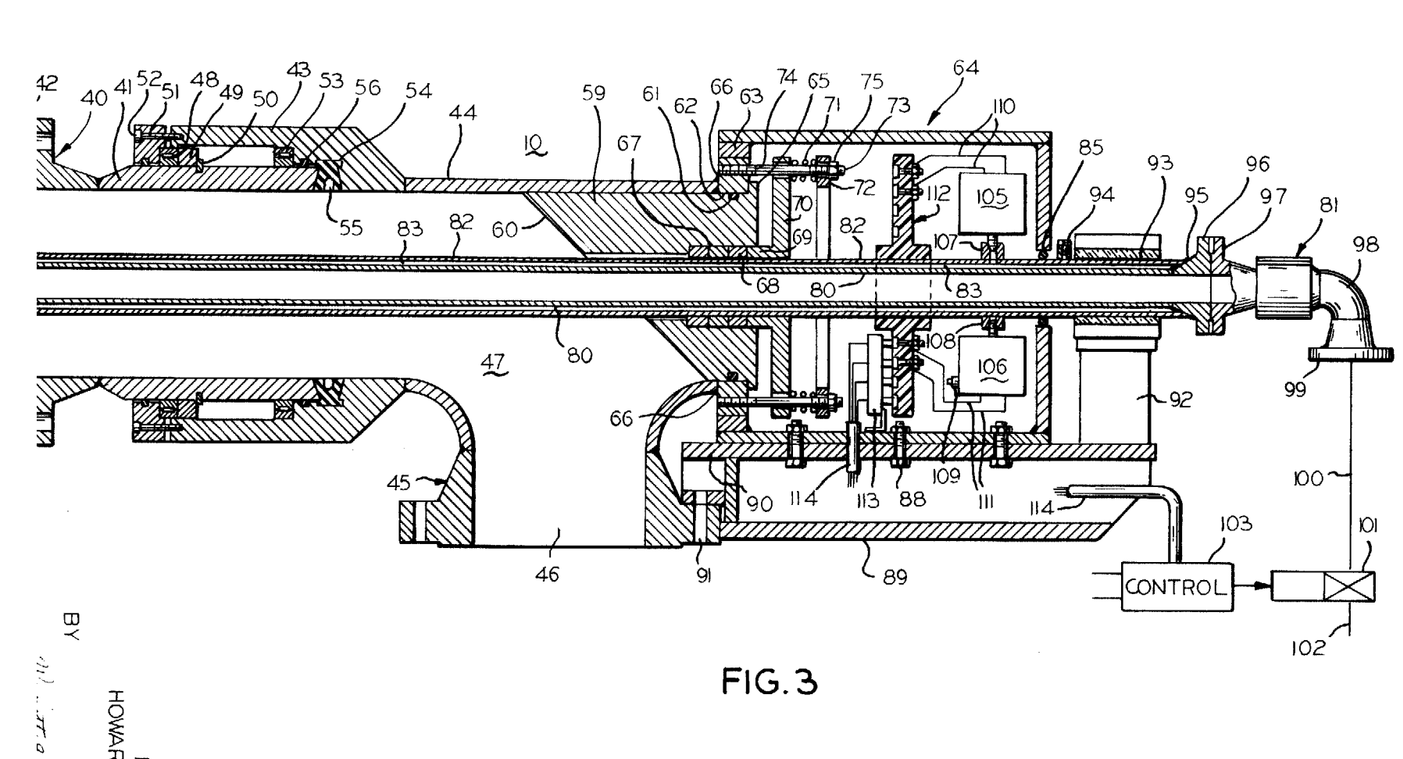
FIG. 3 is an enlarged longitudinal vertical section of the rotary joint which is shown affiliated with the vessel in FIG. 1.

The construction of the new rotary joint 10 will now be discussed. Note in FIG. 1 that trunnion shaft 26 has internal passageways and that the rotary joint 10 is connected to an end of the shaft by means of a flange 40 which is an integral part of a hollow cylindrical element 41 as can be seen in FIG. 3. Flange 40 is fastened to the end of trunnion shaft 26 by means of bolts, not shown, which pass through bolt holes such as 42 which are circularly arranged in the flange. The sealing gasket which would normally reside on the face of flange 40 is not shown. It will be evident that flange 40 and its associated hollow cylindrical element 41 will rotate with trunnion shaft 26 as the vessel tilts. Surrounding cylindrical element 41 is an outer cylinder 43 which is integral with a hollow member 44. The latter may be generally cylindrical except for having a flanged T-fitting 45 in which there is an inlet opening 46. The T-fitting may be coupled with sources of various gases such as nitrogen, argon or oxygen which may be delivered alone, in combination, or with various powdered materials entrained in them. These gases and powdered materials are conducted through the interior 47 of hollow member 44 and to the passageway in trunnion shaft 26 from which they eventually flow through pipe 19 to the vessel 11 bottom.

The outer cylinder 43 extends axially from hollow member 44 and is stationary and surrounds rotatable inner cylinder 41. There is a roller bearing 48 journaling rotatable inner cylinder 41 within stationary outer cylinder 43. The roller bearing 48 is prevented from moving axially inward by a flange ring 49 and a retainer ring 50. Bearing 48 is further retained against axially outward movement by a compression ring 51 which is fastened to the end of stationary outer cylinder 43 with several screws 52. Another roller bearing 53 is also present for supporting and maintaining true alignment between stationary outer cylinder 43 and rotatable inner cylinder 41. Gas is prevented from leaking through the coaxial assembly just described with an annular seal 54 which has an internal circumferential groove 55. As can be seen, due to the presence of the groove and the generally trapezoidal shape of the seal 54, gas pressure developed in the interior 47 of hollow member 44 will tend to enhance sealing by expanding the seal axially and radially. An additional sealing ring 56 which is preferably an O-ring may also be used as shown.

The end of hollow member 44 which is remote from trunnion shaft 26 is occupied by a plug 59 which has one face 60 slanted for the purpose of deflecting gas and powdered materials which are projected through inlet 46. Plug 59 fits tightly into hollow member 44 and is further sealed therein with an O-ring 61 which coacts with the inner surface of a bore 62 in a wall 63 of a chamber 64. As can be seen in FIG. 3, plug 59 has a small radial flange 65 that abuts one side of wall 63 which may be welded as at 66 or otherwise secured to hollow member 44.

Plug 59 also has a countersunk central bore 67 which is occupied by some sealing rings 68. The sealing rings are subjected to the force exerted by the cylindrical portion 69 of a gland 70. The gland effects axial compression of sealing rings 68 and concomitant radial inward and outward expansion thereof by virtue of pressure applied to the gland by means of springs 71, for example. The springs 71 are interposed between a face of gland 70 and a backup ring 72. Several bolts 73 pass through the margins of ring 72 and gland 70 and have ends 74 threaded into end wall 63 of chamber 64. The adjustment of nuts 75 on bolts 73 results in development of the desired spring pressure for exerting the axial compressive force on sealing rings 68.

The inner tubular assembly comprised of inner pipe 80 and a concentric protective outer pipe 82 is internally concentric with hollow members 40, 43, and 44 and is used for conducting another gas which may be a hydrocarbon and combustible. The inner tubular element or pipe 80 connects with a swivel joint 81 at one end and to a passageway in trunnion shaft 26 at the other end. Swivel joint 81 will be described in more detail later. A small circular gap 83 exists between outer pipe 82 and inner pipe 80. The outer pipe 82 is preferably made of an abrasion and corrosion resistant metal such as stainless steel. The purpose of outer pipe 82 is to protect inner pipe 80 against abrasion which might result from the impact of the gas entrained solid particles which are conveyed at high velocity through the interior 47 of the rotary joint assembly. Seals 68 are present for the purpose of preventing gas leakage from interior 47 of hollow member 44 along the outer surface of protective sleeve 82 into chamber 64. It will be evident that chamber 64, and gland 70 and its affiliated parts, are all stationary with hollow member 44 and that inner and outer tubes 80 and 82 rotate with trunnion shaft 26 to which they are coupled as will be explained in detail later.

Chamber 64 may be in the form of a box which is fastened by means of bolts such as 88 to a base member 89 which has an extension 90 for supporting the base on the flange of T-connection 45 by means of bolts which are not shown but would pass through at least two of the holes 91 in the T-connection flange. A bearing pedestal 92 is supported from the opposite end of base 89 and includes a bushing 93 in which the outer protective pipe 82 is further journaled and supported. A normally plugged vent 94 is situated next to pedestal 92 and provides for testing the interspace 83 between the concentric inner and outer pipes 80 and 82 for gas pressure that will exist in the event of pipe 82 being punctured by abrasion of the powdered materials which are conveyed through interior space 47. A seal 85 prevents escape of gas, if any, from chamber 64 along outer protective pipe 82 where the latter extends from the chamber.

The vessel remote ends of concentric pipes 80 and 82 are welded to the conical axial extension 95 of a flanged member 96. Flange 96 is connected with a mating flange 97 which forms part of swivel joint 81 and rotates with it coaxially with pipes 80 and 82. Swivel joint 81 also comprises an elbow 98 which terminates in a flange 99 for facilitating connection to a stationary pipe 100 leading back to a solenoid controlled valve 101. A combustible gas such as propane may be fed from a source pipe 102 through valve 101 and pipe 100 to swivel joint 81. An electrical control 103 governs opening and closing of solenoid valve 101 under conditions which will be explained.

Mounted within stationary chamber 64 are pressure switches 105 and 106. Switch 105 detects or responds to any pressure increase that might exist in annular gap 83 between inner and outer pipes 80 and 82. Such pressure would occur in the event of outer protective pipe 82 being eroded and perforated by the powdered materials. The pressure switch 105 communicates with annular space 83 through a bored threaded connector 107. Pressure switch 106 is mounted on a plugged connector 108 which is also fastened to outer pipe 82. Pressure switch 106 has an inlet 109 for sensing any gas pressure increase that might exist within chamber 64. Alternately, pressure switch 106 may also communicate with annular space 83 through a bored threaded connector 108 to act as a safety backup for pressure switch 105. A separate pressure switch, not shown, may then be installed on a stationary member of chamber 64 to sense any gas pressure increase that may exist within chamber 64.

Alternately, the pressure sensing of chamber 64 may be eliminated by not fully enclosing this chamber, allowing a free flow of ambient air through this housing to vent off any escaped gas.

The pressure switches in the illustrated embodiment have electric conductors 110 and 111 leading from them to a slip ring assembly 112 which is mounted tightly on outer pipe 82. The pressure switches 105 and 106 are fastened to outer pipe 82 and rotate with it and with slip ring assembly 112. A brush holder 113, which is mounted on chamber 64 and is stationary, makes sliding contacts with the slip rings in assembly 112 and there are individual leads of a conductor cable 114 which connect with the various brushes in the holder and to valve control 103. The brush holder 113 and slip ring assembly 112 cooperate to enable electric connection of swingable switches 105 and 106 with stationary cable 114 and control 103.

From the description thus far, it will be evident that swivel joint 81 through which hydrocarbon gas is conducted, is located remotely from the hollow member 44 through which oxygen is conducted and remotely from the seals 68 through which oxygen could conceivably leak. It is leakage of oxygen in the direction of the swivel joint 81 which is most likely to result in combustion, particularly if the swivel joint 81 leaks. The distance between the two gas conductors, of course, contributes toward any leaking gases being dispersed and distributed in the atmosphere at low enough concentration to militate against combustion occuring. However, there is some probability of a leak developing through the seals or as a result of erosion of the members which carry abrasive materials. If such leaks occur from the oxygen side, pressure must necessarily build up in chamber 64 in which case pressure switch responds quickly by closing a circuit to the control 103. Upon this event, solenoid valve 101 is operated to shut off the supply of propane or other combustible gas to swivel joint 81. A similar control may be provided for substituting air for oxygen until the vessel is tilted to prevent molten metal from filling the tuyeres before they are tilted to a point above the metal tap line. The same shut off action takes place if pressure switch 105 detects oxygen or other gas pressure in annular space 83 between pipes 80 and 82.

From inspection of the rotary joint 10, it will be evident that any other leaks which might develop such as through seal 54 will result in gas flowing into the atmosphere at a place which is quite remote from swivel joint 81 in which case the probability of a combustible gas mixture developing sis reduced significantly.

FIG. 2 shows how concentric pipes 80 and 82 are terminated in trunnion shaft 26. The trunnion shaft gas passageway for gas and powdered materials is designated 47' to indicate that it is a continuation of hollow space 47 in the rotary joint assembly of FIG. 3. Protective pipe 82 is welded directly to an axial extension 116 of a plug-like adapter element 117 which is anchored in shaft 26 by means of a recessed collar 118 that is secured to plug 117 with screws 119. Suitable O-ring seals 120 and 121 are also provided for self-evident purposes. Inert hydrocarbon gas pipe 80 is welded about its periphery where it attaches to extension 116 of plug 117. The interior of pipe 80 is coaxial with a bore 122 in adapter 117. A radial bore 123 extending from axial bore 122 communicates with the flanged and sealed end 124 of pipe 24 which leads to the hydrocarbon gas jets 22 at the vessel as described earlier. The oxygen or other gases and entrained powdered material turn and flow through a vertical passageway 125 which connects with pipe 19 that conducts the gas and powdered material to jets 17 in the bottom of vessel 11 as discussed earlier.

An alternative arrangement for conducting two different gases such as argon and oxygen by means of concentric and coaxial tubular elements which run endwise into a hollow vessel trunnion shaft and connect with stationary gas sources by means of a swivel joint will now be described in reference to FIG. 4. This figure shows a fragment of an argon-oxygen reactor vessel 135 which includes a metal shell 136 that has a lining 137 of refractory material. In vessels of this type, oxygen and argon are diffused through molten metal contained in the vessel for removing phosphorous from the melt as is required in connection with making stainless steel. In this arrangement an argon-oxygen mixture is injected into the melt and air or argon or other inert gas may be delivered to a shroud, not shown, at the top of the vessel. Since vessels of this type are adapted to tilt on horizontal trunnion shafts it is necessary to deliver the gases through the trunnion shaft by means of a rotary joint if the use of flexible hoses is to be avoided as is desirable.

Figure 4:
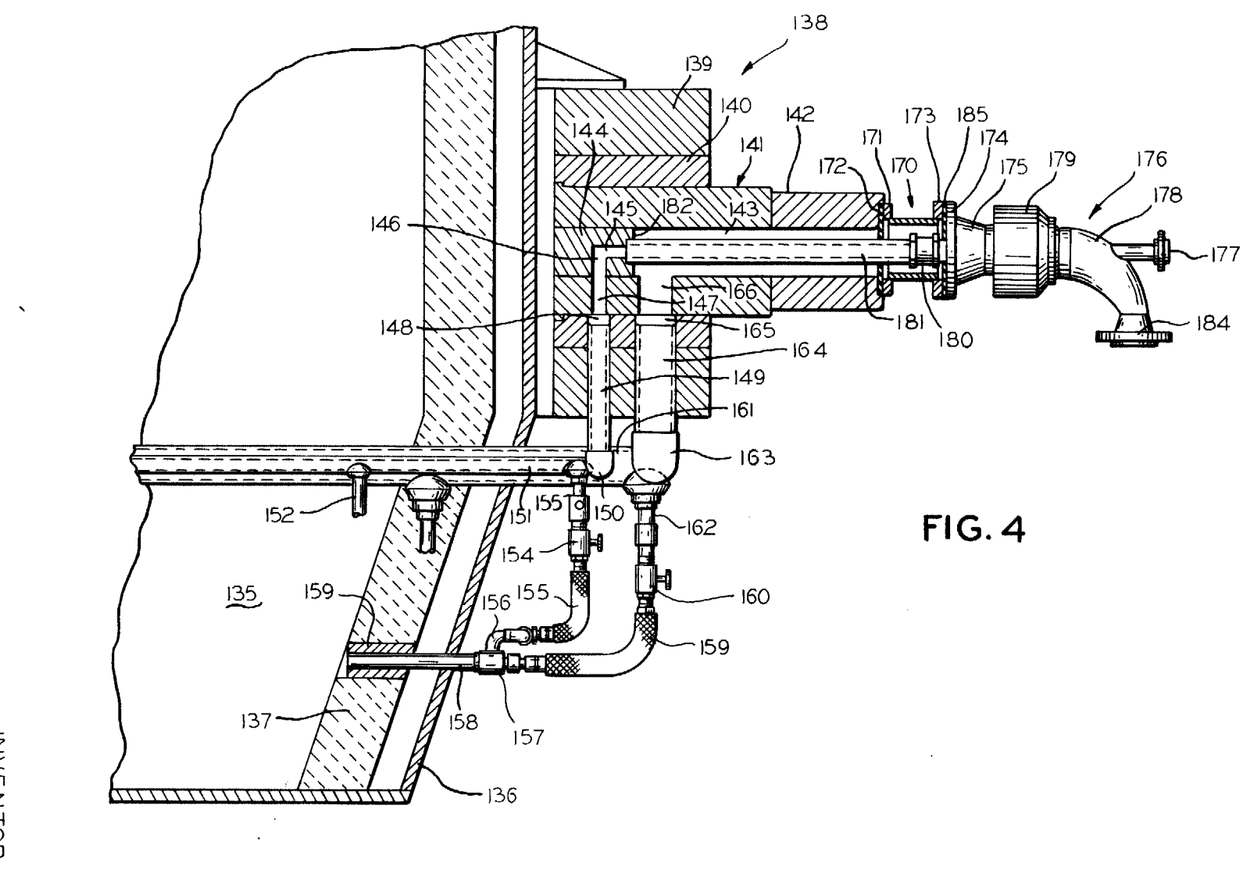
FIG. 4 is a fragment of an argon-oxygen reactor vessel with which an alternative rotary joint is shown.

In FIG. 4, the trunnion ring which surrounds and supports vessel 135 is marked 138. In a side of the trunnion ring is a block 139 which has a suitable insert 140 in which a trunnion shaft 141 is mounted. The trunnion shaft 141 has a reduced diameter portion 142 which normally receives bearings, not shown, for journaling the trunnion shaft in a suitable stationary support, not shown. The trunnion shaft has a central cylindrical bore 143 which is occupied at one end by an adapter means 144. The adapter 144 serves as a connector fitting and has a central bore 145 which intersects at a right angle with a radial bore 146. This radial bore is continuous with another bore 147 which extends radially through trunnion shaft 141 and block 140. A single gas such as argon or air or a mixture thereof is conducted through continuous bores 145–147 during operation of the vessel. Bore 147 terminates in a coupling 148 which is coupled to a pipe 149 that has an elbow 150 at one of its ends. Elbow 150 connects with a pipe 151 that is curved and wraps around the exterior of the vessel 135 as shown. Extending downwardly from pipe 151 are a plurality of nipples 152 and 153, for example, the latter one of which is connected through suitable fittings and a valve 154 to a hose 155 which connects by means of suitable fittings 156 with a Tee 157. Extending from Tee 157 is a nozzle pipe 158 that terminates in a tuyere 159 located in the refractory lining 137 of the vessel and near its bottom or at least below the surface of the molten metal within the vessel. Thus, argon and/or air may be delivered through nozzle 158 to the interior of the vessel if desired. Pure air or argon are often delivered through hose 155 and nozzle 158 when the main argon-oxygen supply is shut off so as to prevent molten metal from plugging the tuyeres such as 159. Pure argon may also be injected when the vessel is tilted to maintain an inert atmosphere therein.

Argon and oxygen mixed in proper proportion can also be delivered to nozzle 158 through Tee 157 from a hose 159 which connects through a valve 160 and suitable fittings to a pipe 161. Pipe 161 may also wrap around vessel 135. The pipe 161 has several circumferentially spaced downwardly extending nipples 162 which each connect with Tees corresponding with Tee 157 by means of hoses corresponding with hose 159. Pipe 161 has an elbow 163 at its end which is coupled with a vertical pipe 164. Pipe 164 joins with a connector 165 that communicates with axial bore 143 in the trunnion shaft 141 by means of a large radial bore 166 in the trunnion shaft. Thus, there is an independent passageway for argon-oxygen through trunnion shaft 141 and this path includes axial bore 143 and radial bore 166.

At the vessel remote end of bore 143 and trunnion shaft 141 there is a thimble 170 which has a flange 171 at one end that bolts onto the end of trunnion shaft 141. A gasket 172 is interposed between the flange and the trunnion shaft. At the other end of thimble 170 there is another flange 173 which bolted to a flange 174 of an adapter 175 which, of course, rotates with the thimble and the trunnion shaft when the vessel is tilted. Adapter 175 is part of a swivel joint which is generally designated by the reference numeral 176.

A pipe 177 extends into an elbow portion 178 of swivel joint 176. Within a cylindrical part 179 of the swivel joint there is a rotary seal joint, not visible, that serves as a continuation of pipe 177 and extends into a coupling 180 which is inside of thimble 170. A pipe 181 connects with coupling 180 and extends to adapter 144 where it may be sealed by welding as at 182 or by other suitable means. Thus, a gas such as argon which is admitted to inlet pipe 177 is conducted through swivel joint 176 and to the right angularly connected bores 145 and 147 in adapter 144. Pipe 181, of course, also rotates with the trunnion shaft 141. Pipe 177 and elbow 178 remain stationary.

An argon-oxygen source may be connected to inlet flange 184 on the elbow 178 of swivel joint 176. The argon-oxygen mixture which flows through elbow 178 also passes through a rotary joint, not visible, in cylindrical part 179 of swivel joint 176 from which it makes connection with conical adapter 175. There is a suitable opening through flanges 173 and 174 and intervening gasket 185 so that this gas mixture may flow to the interior of thimble 170 and through axial trunnion shaft bore 143 and then to branch bore 166 from which it flows down through pipe 164 and into large semicircular pipe 161. When valve 160 is open, mixture flows through the hoses corresponding with hose 159 and into Tees corresponding with Tee 157. From the Tees the mixture, of course, flows through nozzles 158 and into the vessel.

Figure 5:
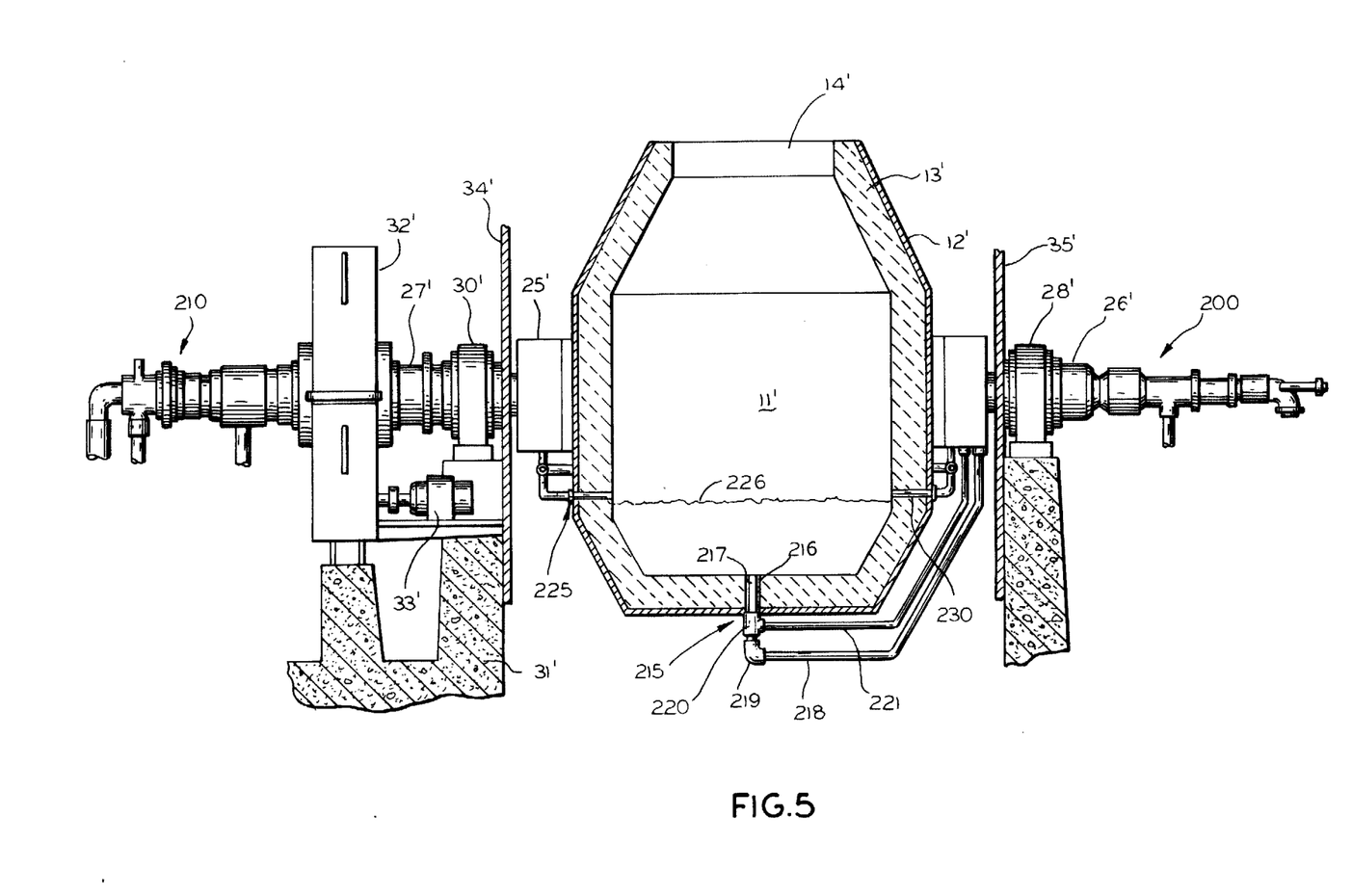
FIG. 5 is an elevational view, partly in section, of a metallurgical vessel to which a pair of alternative rotary joints are applied.

Referring now to FIG. 5, many of the basic component parts of vessel 11' are similar to those of vessel 11 shown in FIG. 1. Accordingly, the similar parts have been numbered the same as in FIG. 1 with the addition of a prime after the number. A converter vessel 11' is shown which has rotary joint 200 affixed to the idler side trunnion shaft 26'. Vessel 11' is provided with one or more tuyeres 215 extending upwardly through the vessel bottom. The tuyeres 215 consist of a pair of concentric tubes 216 and 217 having an annular space between the tubes. The inner tube 217 is supplied with gas through pipe 218 and elbow fitting 219 which are suitably connected to the interior of tube 217. Pressurized gases are also fed to the annular space between tubes 216 and 217 through a T-fitting 220 and pipe 221. The T-fitting is constructed so as to envelop the inner pipe 217 while retaining an annular passage for conducting the gas supplied through pipe 221. Vessel 11' is also provided with one or more tuyeres 225 extending through the side of the vessel above the surface of the molten metal 226. In addition one or more tuyeres 230 also extend through the vessel side above the surface of the molten metal for injecting a combustible gas such as propane into the vessel interior.

Figures 6, 7:
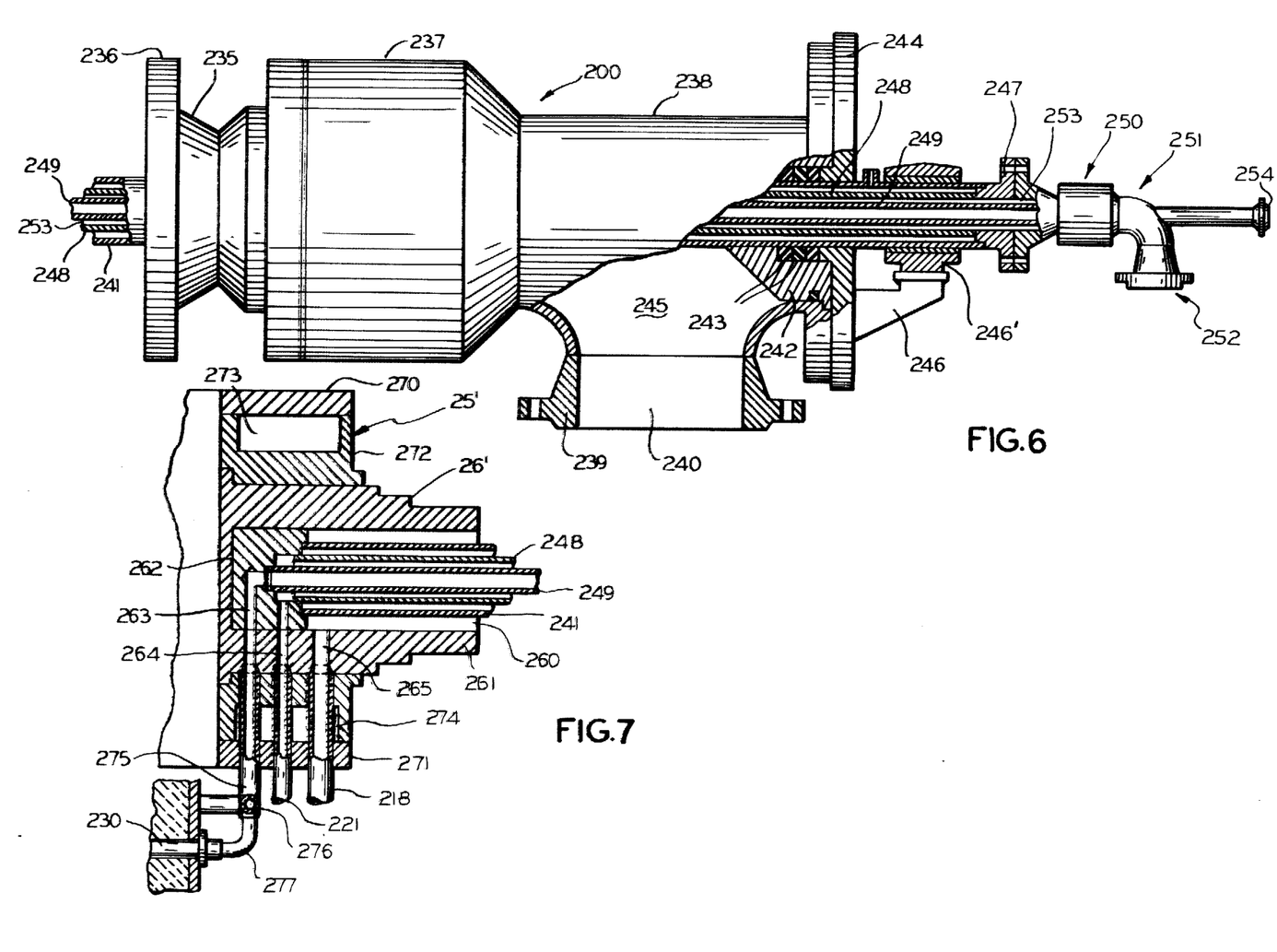
FIG. 6 is an isolated and enlarged view of a portion of the rotary joint mounted on the idler side of the vessel of FIG. 5, having parts broken away for clarity.
FIG. 7 is a sectional view of the trunnion ring on the idler side of the vessel of FIG. 5.

Referring now to FIGS. 6 and 7, the rotary joint 200 mounted on the idler side of vessel 11' will be described. It will be understood, however, that the joint 200 on the idler side could also be adapted for use on the drive side trunnion. As seen in FIG. 6, the rotary joint 200 has an inner cylindrical element 235 which has a flange 236 at one end for attachment to the idler side trunnion pin 26' by any suitable means such as bolts not shown. The inner element 235 is journaled rotatably within an outer cylindrical element 237 which in turn is affixed to a hollow member 238. The bearings and seals between elements 235 and 237 are similar to those described with regard to rotary joint 10 which was previously discussed, so a detailed description may be omitted. The hollow member 238 has a flanged T-fitting 239 extending from it which has an inlet opening 240. Extending axially through the elements 235, 237 and 238 is a first tubular member 241, constituting a sheath for protecting some tubes within it against erosion, which is concentrically mounted within the cylindrical elements and thus defines a generally annular flow space 245 which connects with inlet opening 240. The tubular erosion protecting member 241 extends through a plug 242 at the end of hollow element 238. Plug 242 has a beveled end inside of space 245 and a central bore, through which the tubular member 241 passes, and is also counterbored to receive a number of seals 243. The seals are held in place by a gland member 244 which is removably attached to the hollow element 238, by means such as bolts, not shown. The tubular member 241 is rotatably journaled in a bearing member 246 which is mounted on a pedestal 246° affixed to the flanged gland member 244. The erosion protecting tube 241 extends to a hollow flanged adapter fitting 247 to which it is dead ended and rigidly affixed by means such as welding or brazing.

Concentrically mounted within the tubular member 241 is a second tube 248 which also is affixed to the flanged adapter 247. The size of the concentric tubes 241 and 248 is such that a small annular space remains between the tubes.

A smaller inner tube 249 is concentrically mounted within tubes 248 and 241 and extends through the flanged adapter 247 back to a rotary joint 250 which is attached to the adapter 247. The rotary joint 250 is part of a swivel fitting 251 which is similar in construction to fitting 176 described previously in reference to FIG. 4. It will suffice to say that the swivel fitting 251 in FIG. 6 has a flanged elbow portion 252 through which a gas such as propane may be supplied and which connects internally with an annular flow passage 253 that is formed between the small inner pipe 249 and the intermediate pipe 248. In adition a pipe 254 extends into the fitting 251 and is rotatably connected to the inner pipe 249 which is supplied with gas such as propane through pipe 254. The swivel fitting is constructed so that the inlet elbow 252 and pipe 254 remain stationary while pipes 241, 248 and 249 and adapter 247 rotate when the vessel 11' is rotated.

Refer now to FIG. 7 for a discussion of how the rotatable joint assembly 200 of FIG. 6 connects with the vessel trunnion pin 26'. The trunnion pin 26' has a central axial bore 260 extending through it. The end 261 of the trunnion pin is adapted for removably receiving the flanged portion of the rotary joint 236 by means such as a gasket and cap screws, not shown. The three concentric pipes 241, 248 and 249 extend through the cylindrical bore 260 and terminate in an adapter 262 which serves as a connector and is positioned in the trunnion pin 26' at its end closest to the vessel 11'. A first axial and radial passage 263 is formed in the adapter 262 which is continuous with the bore of the inner pipe 249 which is suitably affixed to the adapter 262 by means such as welding, for example. A larger second radial bore 264 extends part way into the adapter 262 and connects with annular passage 253 existing between pipes 248 and 249. Pipes 248 and 241 are also suitably affixed to the adapter member 262, by welding for example, so that when trunnion pin 26' is rotated, the adapter 262 rotates along with pipes 241, 248 and 249. Adapter 262 is sealingly mounted in bore 260. The outer pipe 241 forms an annular passage in the trunnion pin defined by the cylindrical bore 260 and the outer surface of the pipe 241. This passage terminates or is dead ended at adapter 262. Axial and radial passage 263 extends to join the central bore in adapter 262 and thereby forms a continuous passageway with the interior of pipe 249. Radial bore 264 extends to connect with the annular passage 253 between pipes 248 and 249, while the third radial bore 265 forms a continuous passage with the annular space between pipe 241 and the inner surface of cylindrical bore 260 of trunnion pin 26'.

As seen in FIG. 7, the trunnion 26' is mounted in trunnion ring assembly 25' which consists of a ring-like top cap 270 and a bottom cap 271 between which a central rib assembly 272 extends which receives the trunnion pin 26'. A pair of upper and lower annular coolant fluid passages 273 and 274, respectively, extend around the trunnion ring and are internally sealed by the caps 270 and 271. Extending through the lower cap 271 are pipes 218, 221, and 275 which threadingly engage trunnion pin 26' in alignment with the passages 263, 264 and 265 and once positioned are sealed in cap 271 to prevent leakage of cooling fluid from the passage 274. Pipe 218 continues as seen in FIG. 5 downwardly to connect with the bottom tuyere assembly 215 while pipe 221 also continues down to the tuyere assembly 215 and supplies propane gas for injection into the vessel 11'. Pipe 275 extends downwardly to a header 276 which extends around the vessel 11' as can be seen in FIG. 5 in conjunction with FIG. 7. The pipe 275 may supply propane gas to the header 276 and one or more elbow fittings 277 are connected to header 276 to conduct propane gas to the upper tuyeres 230 which extend into vessel 11' for injecting gas above the surface 226 of the molten metal.

Having thus described rotary joint 200, it will be appreciated that it differs from rotary joint 10 in that an additional concentric tube has been added, resulting in three flow passages rather than two as in rotary joint 10. In the preferred embodiment, oxygen or oxygen containing gas in which there are entrained finely divided materials such as burnt lime, is conducted under pressure from a supply pipe, not shown, to the flanged T-fitting 239 whereby it goes through passage 245, bores 260 and 265, pipe 218 from which it ultimately flows into the vessel 11' through tuyere 215. The tube 241 serves as a protective outer tube similar to the outer tube 82 of rotary joint 10 and is preferably stainless steel. The annular passageway between pipes 248 and 249 and the central passage of pipe 249 may be used to conduct propane gas to the vessel 11'. Two separate flow passageways are provided so that the propane to be injected over the top of the melt may be controlled separately from the propane gas injected into the bottom of the melt. It will also be appreciated that a gas detection means such as means 64 described with respect to rotary joint 10 could easily be adapted to be mounted on the end of rotary joint 200. Such gas pressure detection means having been described previously, it is unnecessary to describe their use or construction with respect to rotary joint 200. It will suffice to say that the gas detecting means would function in the same manner and no additional adaptation would be necessary to accommodate the inner tube 249 which carries propane gas, since leakage between pipes 249 and 248 would merely result in an intermixture of propane gas which would not pose any additional hazard to the operation of this system. Therefore, the gas detecting means need only function to detect leaks between the propane supply and the oxygen supply to initiate a signal to shut down one or the other of the gas supply systems to prevent explosion or combustion which might occur if oxygen and a hydrocarbon gas mix and are ignited.

Figures 8, 9:
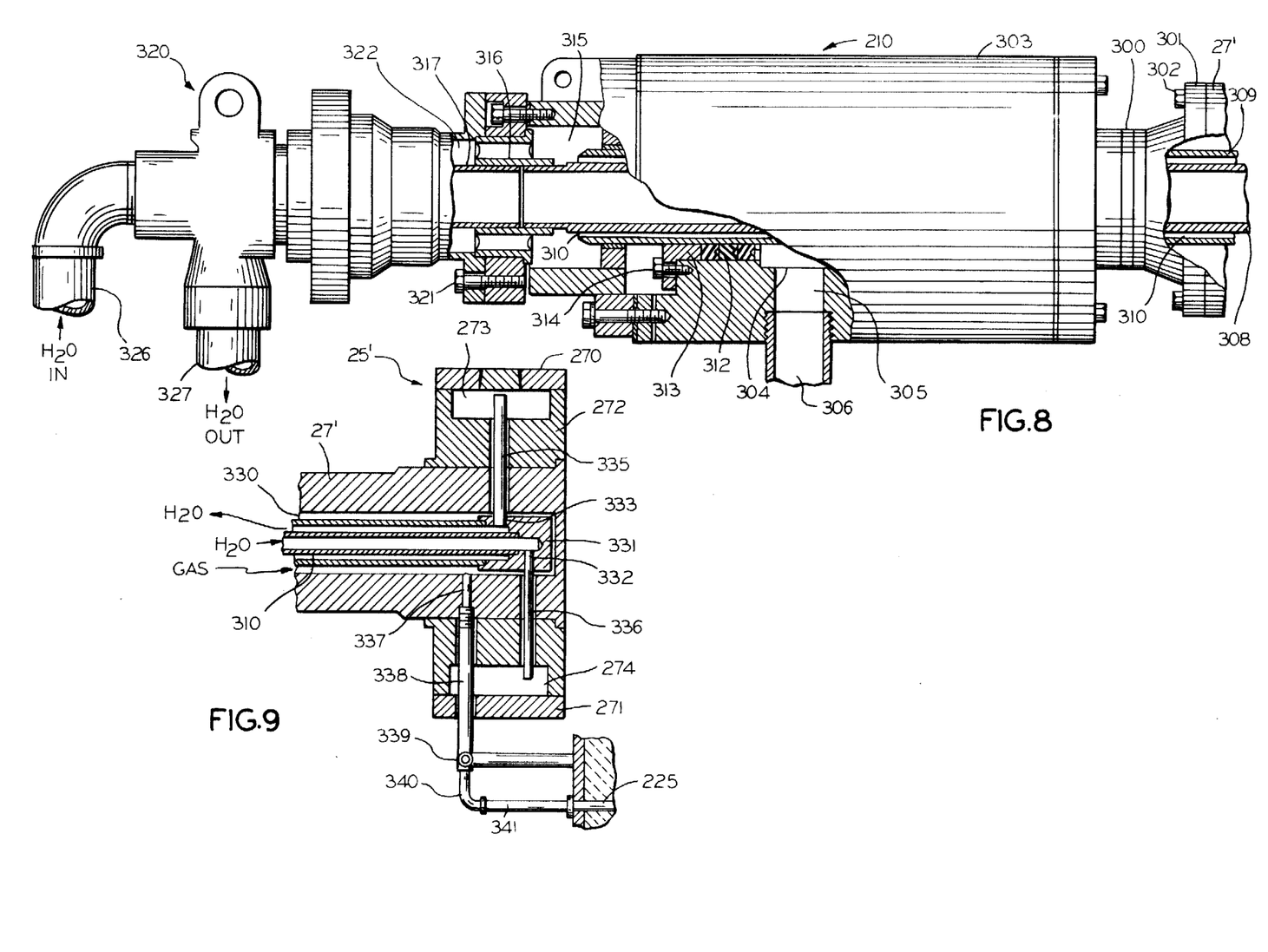
FIG. 8 is an enlarged view partly in section of the rotary joint mounted on the drive side of the vessel of FIG. 5.
FIG. 9 is a sectional view of the trunnion and trunnion ring on the drive side of the vessel of FIG. 5.

FIGS. 8 and 9 show a rotary joint for conducting cooling water to and from a vessel and for conducting gas or gas and entrained particles to a vessel. The rotary joint 210 which is mounted on the drive side of vessel 11' will now be described. The joint 210 comprises an inner cylindrical element 300 having a flanged end 301 attached to the end of trunnion pin 27' by means such as bolts 302 so that cylindrical element 300 will rotate when the trunnion pin 27' rotates. The inner cylindrical element 300 is journaled for rotation within an outer element 303 by means such as bearings and seals similar to those utilized with rotary joint 10 as shown in FIG. 3. Thus, the inner element 300 rotates with trunnion pin 27' when the vessel is tilted and the outer element 303 remains stationary. Element 303 has a large central bore 304 which connects with a radial bore 305 to which is connected a gas supply pipe 306 that connects to a pressurized source, not shown, of oxygen or oxygen containing gas, for example.

Also mounted within the element 303 is a pair of concentric tubes comprising an inner tube 308 and an outer tube 309, the tubes having a concentric flow space 310 between them. The tubes extend into the trunnion pin 27' in a manner that will be described later, and the outer tube 309 is rotatably supported within element 303 by means such as sealing rings 312 which are held in place by a gland 313 and bolts 314. The end of tube 309 remote from the trunnion pin terminates in a chamber 315 while the inner tube 308 connects through coupling 316 to a tube 317 which is part of a rotary joint 320. The rotary joint 320 has an annular flow passage around tube 317 and is bolted to element 303 by means such as bolts 321 such that the annular flow passage 322 of rotary joint 320 aligns with the chamber 315 connecting to the interior annular passageway 310 between tubes 308 and 309. The rotary joint 320 is of a type which is commercially available and need not be described in detail other than to say that it is adapted to receive a tube 326 for inlet water and a tube 327 for exhausting water, both of which remain stationary during rotation of coupled tubes 308 and 317.

In reference to FIG. 9, the gas and cooling fluid passageways through the trunnion pin 27' will now be described. The vessel supporting trunnion pin 27' has an inner axially extending bore 330 which has an adapter 331 at its terminal point. Tubes 309 and 308 extend into the bore 330 and are suitably connected to the plug adapter 331 in a leak-proof manner. A radial hole 332 in the adapter 331 connects with the inner passageway or bore of the inner pipe 308. A second radial hole 333 extends through the upper portion of the adapter 331 and connects with the annular passageway 310 between the tubes 308 and 309. The top and bottom portion of the trunnion pin 27' have radial holes which align with radial bores 332 and 333. The radial holes continue through the central portion 272 of trunnion ring 25' and terminate in the upper and lower coolant fluid passages 273 and 274, respectively, which extend around trunnion ring 25'. A pipe 335 extends from coolant passage 273 down through trunnion pin 27' to the adapter 331 where it is threadingly engaged. A similar pipe 336 extends radially through the trunnion pin 27' and threadingly engages adapter 331 in alignment with bore 332 and terminates at its other end in the coolant passage 274. A third hole 337 extends radially through trunnion pin 27' and connects with the annular space between outer tube 309 and the cylindrical bore 330. A pipe 338 for conducting gas is threadingly engaged with the trunnion pin 27' and extends downwardly through the trunnion ring assembly terminating in a header 339 which extends at least partially around the vessel 11'. Pipe 338 is sealed externally where it extends through the end cap 271 and inner portion 272 of the trunnion ring to prevent leakage of coolant flowing through passage 274. Elbow fittings 340 and pipes 341 are provided for connecting the header 339 with one or more tuyeres 225 through which oxygen, for example, is injected into the vessel 11'.

The rotary joint 320 in FIG. 8 is constructed so that axially extending tube 317 is rotatable relative to the body of the joint 320. Thus, when trunnion pin 27' rotates, the inner tubes 308 and 309 and inner cylindrical element 300 will rotate also, while the outer element 303 and swivel joint 320 remain stationary. Cooling water may be supplied to the trunnion ring from supply pipe 326, through joint 320 and through the central pipe 308 where the water flows to the adapter element 331 and then downwardly through pipe 336 into trunnion ring cooling passage 274 for circulation around the trunnion ring. The heated cooling water flowing through passage 274 is ultimately directed upwardly by passage means, not shown, to the upper cooling passages 273 where the flow will continue back down through pipe 335 into the annular flow passage 310 in FIG. 9 and back out in FIG. 8 to chamber 315 and annular passage 322 and then out rotary joint 320 through pipe 327. In addition, pressurized gas such as oxygen may be fed through pipe 306, which extends radially into body 303 in FIG. 8, and into the annular flow space between pipe 309 and bore 304 from which it continues down through bore 330 into passage 337 and pipe 338 down to the header assembly 339 where it may be distributed to tuyeres 225 for injection into the interior of vessel 11' above the surface 226 of the melt.

While rotary joint 210 in FIGS. 8 and 9 has been described with respect to the drive side of a vessel 11' and rotary joint 200 has been described with respect to the idler side, it will be apparent to those skilled in the art that the joints 200 and 210 could easily be adapted to be mounted on either side of the vessel 11' merely by providing appropriate connections and passages in the vessel trunnion pins 26' and 27'. It will also be apparent to those skilled in the art that although one rotary joint has been described for conducting water into and out of the central trunnion pin passageways along with a gas, and the other rotary joint has been described as conducting propanne gas through two separate passages along with an oxygen containing gas, the inventive concept could be applied in a number of combinations equally well. For example, cooling water could be injected into the trunnion ring through one trunnion pin and exhausted through the trunnion pin on the opposite side of the vessel. In addition the parallel flow of propane gas could be provided on one side of the vessel along with a simultaneous flow of water, thus eliminating the need for the leakage detection means as any leakage would not be to a combustible oxygen mixture. Similar variations are possible with respect to oxygen, oxygen containing gas or other gases in numerous combinations.

Accordingly, the scope of the invention is not to be limited to the embodiments described, but rather is to be determined solely by an interpretation of the claims which follow.

I claim:

1. A rotary joint for conducting multiple fluids to a metallurgical vessel and the like, comprising:
   a. tubular means adapted to connect to a rotatable vessel for delivering a first fluid to the interior of the vessel in one path,
   b. swivel joint means coupled with said tubular means, said swivel joint means being constructed and arranged for being connected with a first source of fluid and for permitting said tubular means to turn with said vessel,
   c. hollow means through which said tubular means extends, said hollow means providing in cooperation with the outside of said tubular means a passage for delivering a second fluid to a vessel along another path, said hollow means having an inlet for said second fluid,
   d. means effecting a rotational seal joint between said hollow means and said vessel for permitting said vessel to rotate while said hollow means remains stationary,
   e. chamber means through which said tubular means extends from said hollow means,
   f. rotational seal means constructed and arranged to prevent gaseous fluid from leaking from said hollow means to said chamber means and to permit said tubular means to rotate with said vessel in respect to said hollow means and said chamber means, and
   g. means adapted to sense gas in said chamber means which gas may be present as a result of leakage from said hollow means.

2. The invention set forth in claim 1 including:
   a. a second tubular means surrounding the aforesaid tubular means and extending therewith through said hollow means whereby to protect the aforesaid tubular means from erosion by particles entrained in gaseous fluid which flows through said hollow means.

3. The invention set forth in claim 2 wherein:
   a. said rotational seal means is interposed between said hollow means and said chamber means in sealing relation with said second tubular means and said second tubular means extends sealingly out of said chamber means and is terminated in a seal with respect to the aforesaid tubular means.

4. A rotary joint for conducting gasses in separate paths to a metallurigical vessel and the like, comprising:
   a. a first tubular means and a hollow means surrounding said tubular means, said tubular means being adapted to be connected for conducting a gas stream to a gas inlet of said vessel and for rotation therewith, said hollow means being stationary and having a gas inlet,
   b. means for effecting a rotational seal between said hollow means and said tubular means to permit said vessel to rotate relative to said hollow means, said hollow means providing a passage for conducting a strem of gas to a second gas inlet of said vessel, and
   c. swivel joint means coupled with said tubular means for furnishing a gas thereto relatively remote from the vessel,
   d. gas detector means in a region between said hollow means and said swivel joint means, said gas detector means responding to the presence of a gas in the event of a leak from said hollow means toward said swivel joint means.

5. A rotary joint for conducting gases in separate paths to a metallurgical vessel and the like, comprising:
   a. a tubular means and a hollow means surrounding said tubular means, said tubular means being adapted to be connected for conducting a gas stream to a gas inlet of said vessel and for rotation therewith, said hollow means being stationary and having a gas inlet, b. means for effecting a rotational seal between said hollow means and said tubular means to permit said vessel to rotate relative to said hollow means, said hollow means providing a passage for conducting a stream of gas to a second gas inlet of said vessel, and c. swivel joint means coupled with said tubular means for furnishing a gas thereto relatively remote from the vessel, d. chamber means fixedly sealed to said hollow means intermediately of said last named means and said swivel joint means, and e. switch means responsive to pressure which may develop in said chamber means in the event of leakage of the gas from said hollow means.

6. For metallurgical apparatus including a vessel, trunnion ring means supporting said vessel and a pair of journaled trunnion pin means extending from said ring means to enable tilting said vessel, at least one of said pin means having an axial hole, improved means for communicating fluids with said apparatus, comprising:

a. first tubular means and second tubular means surrounding the first tubular means in spaced relationship and extending jointly into the hole in said trunnion pin, said second tubular means being spaced from the margins of said hole to define a passage therebetween, b. a first member defining a fluid passageway and surrounding said tubular means in spaced relationship, said first member having means for fastening it to said trunnion pin means in registry with its axial hole, said first member being rotatable with said trunnion pin, c. a second member, means defining a passageway in said second member and with respect to which said first member is sealingly rotatable, said second member having fluid inlet means in continuous communication with the passageway in said second member, d. said second tubular means extending into said second member, an opening formed in that portion of said tubular means inside of said second member, e. seal means interposed between said last named opening and said passageway in said second member, f. said first tubular means extending through said second member and being continuous therin, g. swivel joint means including elements one of which is sealably rotatable in the other and which define at least two fluid passageways, said swivel joint means being coupled to said second member in such manner that one of the passageways in said swivel joint means communicates with said first tubular means and the other of its passageways communicates with said opening of said second tubular means.

7. The invention set forth in claim 6 including:

a. adapter means coupled with said first and second tubular means at the ends thereof which are in said axial hole of said trunnion pin means, b. said adapter means having a pair of axially disposed bores with which the ends of said tubular means respectively register and which ends are sealingly engaged with said adapter means, c. said adapter means also having generally radial holes communicating with said bores, and d. said trunnion pin means having other generally radial holes registered respectively with said radial holes in said adapter means to provide means for communicating fluids between said apparatus and the passageways in and between said tubular means and between said second tubular means and said axial bore.

8. The invention set forth in claim 7 including:

a. tuyere means in said vessel for injecting gas therein, b. said means for communicating fluids including conduit means for connecting at least one of said radial trunnion pin holes with said tuyere means.

9. The invention set forth in claim 7 wherein said trunnion ring means has a coolant fluid passageway and including:

a. conduit means coupling one of said radial holes in said adapter means with said coolant fluid passageway to provide fluid to said passageway and second conduit means coupling the other of said radial holes in said adapter means with said passageway to enable withdrawal of coolant fluid therefrom.

10. The invention set forth in claim 9 including:

a. tuyere means in said vessel for injecting gas therein, b. third conduit means coupling said axial trunnion pin hole with said tuyere means whereby to provide for selectively injecting gas into said vessel independently of circulating coolant through said trunnion ring passageway.

11. For metallurgical apparatus including a vessel, trunnion ring means supporting said vessel and a pair of trunnion pin means extending from said ring means to enable tilting said vessel, at least one of said trunnion pin means having an axial bore formed therein, improved means for communicating fluids with said apparatus, comprising:

a. an innermost tubular means and an outermost tubular means, said tubular means being substantially coaxial and being of sufficient length to extend into the axial bore in said trunnion pin means, b. a first member surrounding said tubular means, said first member having a passageway formed therein and means for fastening the member to said trunnion pin means in fluid communication with the said axial bore thereof, said first member being rotatable with said trunnion pin means, c. a second nominally stationary member with respect to which said first member is sealingly rotatable, said second member having means defining a fluid inlet and a passageway in communication with said passageway in said first member, said tubular means extending through said members and being rotatable with said trunnion pin means, d. the end portions of said tubular means remote from said trunnion pin means being adapted for receiving fluids, whereupon said improved means defines a plurality of fluid passageways including passageways inside and between said tubular means and a passageway between said outermost tubular means and the interiors of said members.

12. For metallurgical apparatus including a vessel, trunnion ring means supporting said vessel and trunnion pin means extending from said ring means to enable tilting said vessel, at least one of said pin means having an axial bore, improved means for communicating fluids with said apparatus, comprising:
 a. a first innermost tubular means, a second larger intermediate tubular means surrounding said first tubular means in spaced relationship, and a third outermost tubular means surrounding said second tubular means in spaced relationship, the inside of said first tubular means and the space between said first and second tubular means defining fluid conducting passageways and said tubular means being of sufficient length to extend into said axial trunnion pin bore,
 b. a first member surrounding said third tubular means, said member including means for fastening it to said trunnion pin means in registry with and having a passageway in fluid communication with said axial trunnion pin bore, said member being rotatable with said trunnion pin means,
 c. a second nominally stationary member with respect to which said first member is sealingly rotatable, said second member having a fluid inlet and a passageway formed therein in communication with the passageway in said first member, said tubular means extending through said members and being rotatable with said trunnion pin means,
 d. rotational seal means interposed between said second member and said outermost third tubular means,
 e. the end portions of said tubular means which are remote from said trunnion pin means being constructed and arranged for receiving fluids, whereupon said improved means has at least three fluid passageways, one being between said third outermost tubular means and said members, another being between the inside of said second tubular means and the outside of said first tubular means and another being the inside of said first tubular means, said outermost third tubular means constituting a protective sheath for the tubular means inside of it.

13. For metallurgical apparatus which includes a vessel for molten metal and has journaled pin means associated therewith for rotating said vessel, said pin means having an axially extending opening, improved means for jointly or individually communicating selected fluids with said apparatus comprising:
 a. a stationary member having a first internal passageway formed therein and an inlet coupled to said passageway and adapted for gas communicating therewith,
 b. means having a second internal passageway formed therein and communicating with said first passageway, said last named means being constructed and arranged for being fastened to said pin means to rotate therewith and to put said passageways and said axial opening in said pin means in continuous communication for conducting fluid from said inlet to said apparatus,
 c. first tubular means extending through said stationary member and into said axial pin opening for conducting coolant fluid to or from said apparatus, said first tubular means being rotatable with said pin means,
 d. second tubular means surrounding said first tubular means in concentric spaced relation to define a coolant fluid passageway between the outside of said first and the inside of said second tubular means the latter of which also extends into said axial pin opening and rotates with said pin, said second tubular means being sealably rotatable in said first internal passageway of said stationary member,
 e. a chamber adjacent said stationary member, the passage defined between said first and second tubular means communicating with said chamber,
 f. a swivel joint assembly having means defining one coolant fluid conducting path communicating with said chamber and another coolant fluid conducting path communicating with said first tubular means, said swivel joint assembly having stationary inlet and outlet means communicating with the fluid conducting paths thereof.

14. The invention set forth in claim 13 including:
 a. trunnion ring means surrounding and supporting said vessel and having a coolant fluid passage therein, said pin means extending from said ring means, and
 b. means communicating the passageway inside of said first tubular means and the passageway between said first and second tubular means, respectively, with said coolant fluid passageway in said trunnion ring.

15. The invention set forth in claim 13 including:
 a. tuyere means in said vessel for selectively injecting gaseous substances therein, and
 b. means communicating said tuyere means with the passageway in said trunnion pin defined between said second tubular means and the interior of said trunnion pin opening.

16. The invention set forth in claim 13 including:
 a. adapter means disposed in said trunnion pin axial opening, said adapter means having a first cavity formed therein and sealingly coupled with an end of said first tubular means and a second cavity axially displaced from said first cavity formed therein and sealingly coupled with an end of said second tubular means, said adapter means having openings formed therein and communicating with the cavities, respectively, and
 b. means communicating with said cavity openings for transporting coolant fluid to and from said cavities, respectively.

17. Metallurgical apparatus including a vessel for molten metal and having journaled pin means associated therewith for rotating said vessel, said pin means having an axially extending opening, improved means for jointly or individually conducting fluids to said apparatus, the improvement comprising:
 a. a stationary member in rotational sealing connection with said pin means, said stationary member having means defining a first passageway communicating with said axially extending opening in said pin means and having an inlet communicating with said first passageway to thereby provide a first fluid path,
 b. first tubular means and second tubular means surrounding said first means in spaced relation to provide second and third fluid paths, the second fluid path being defined by the inside of the first tubular means and the third fluid path being defined by the space between said first and second tubular means, said first and second tubular means extending through said stationary member and into said axial opening of said pin means, c. means sealing said tubular means for rotation within and relative to said stationary member, d. a swivel joint assembly having at least a pair of stationary inlets and corresponding outlets, one of said outlets communicating with said second fluid path inside of said first tubular means and the other outlet communicating with said third fluid path between said tubular means, and e. means for communicating said first, second and third fluid paths to said apparatus from within said pin means.

18. The invention set forth in claim 17 including:

a. a third tubular means constituting a protective sheath surrounding said second tubular means and rotatable therewith.

19. The invention set forth in claim 18 wherein:

a. said sealing means is interposed between said third tubular means and said stationary member.

20. The invention set forth in claim 17 including:

a. coupling means disposed in the axial opening of said pin means, said coupling means having axially displaced cavities formed therein with which said first and second tubular means are sealingly connected, and b. conduit means communicating said cavities with said apparatus.

21. The invention set forth in claim 17 wherein:

a. said pin means has a generally radial opening formed therein and communicating with said first fluid path, and b. conduit means communicating said first fluid path through said radial opening to said apparatus.

22. The fluid conducting means set forth in claim 17 including:

a. a third tubular sheath means surrounding said second tubular element and substantially coaxial therewith, and adapter means in said pin opening, said third tubular sheath means being sealingly joined with said adapter means so as to close the end of the space between said second tubular element and said surounding tubular sheath means, b. the outside of said tubular sheath means defining with the inside of said axial pin opening a passageway for transporting fluids such as gas, gas which extrains finely divided materials and coolant, c. said pin means having a hole formed therein and leading generally radially from the opening therein, and d. means for communicating with said radial opening for conducting fluid for utilization in or that has been utilized in said apparatus.

23. Metallurgical apparatus comprising:

a. a vessel having a refractory lining for containing a quantity of molten metal, b. shaft means supporting said vessel for rotation and having an axially extending opening formed therein, c. fluid communicating means having means defining individual passages for conducting fluids through said lining and from the exterior to the interior of said vessel, d. first tubular means and second tubular means surrounding said first tubular means in spaced relation to define a fluid path between said tubular means, each of said tubular means having corresponding ends in said shaft means opening and being rotatable with said shaft means and each of said tubular means having opposite corresponding ends remote from said shaft means opening, e. a stationary member having a passage formed therein and a fluid inlet means to said passage, g. coupling means for coupling said stationary member to said shaft means, said coupling means having a passage for connecting the passage in said stationary member with said shaft means opening, said first and second tubular means extending through said passages, h. first sealing means for effecting a rotation permitting seal between said coupling means and said stationary member, i. second sealing means for effecting a rotation permitting seal between said tubular means and said member, j. swivel joint means having means defining separate fluid conducting paths connected respectively to said first tubular means and said second tubular means whereby to establish separate fluid paths comprising the interior of said first tubular means and the space between said first and second tubular means, another fluid flow path including the passage in said member and the outside of said second tubular means, and k. connecting means for coupling at least one of said paths to said individual passages respectively of said fluid communicating means.

24. The invention set forth in claim 23 including:

a. third tubular means disposed in surrounding relationship to said second tubular means and substantially coextensive and rotatable therewith, said third tubular means constituting a sheath for protecting said second tubular means from the effects of fluid flowing in said member and said shaft means opening.

25. The invention set forth in claim 24 wherein:

a. said second sealing means is interposed between said thrid tubular means and said stationary member.

26. The invention set forth in claim 24 wherein:

a. said shaft means has a generally radial passage means formed therein and leading to said shaft opening, b. said connecting means being connected to said radial passage means.

27. The invention set forth in claim 23 including:

a. second coupling means disposed in said shaft means opening, said second coupling means having cavities with which said corresponding ends of said tubular means are sealingly connected, respectively, b. said connecting means being connected with said cavities, respectively.

28. The invention set forth in claim 23 including:

a. second shaft means supporting said vessel for rotation and having an axially extending opening formed therein, b. third tubular means and fourth tubular means surrounding said third tubular means in spaced relation to define a fluid path between said third and fourth tubular means, each of said third and fourth tubular means having corresponding ends in said second shaft means opening and being rotatable with said second shaft means and each of said tubular third and fourth means having opposite corresponding ends remote from said second shaft means opening, c. a second stationary member having a passage and fluid inlet means to said passage, d. second coupling means for coupling said second stationary member to said second shaft means, said second coupling means having a passage for connecting the passage, said second stationary member with said second shaft means opening, said third and fourth tubular means extending through said passages, e. second swivel joint means having means defining separate fluid conducting paths for connecting respectively to said third tubular means and said fourth tubular means whereby to establish separate fluid paths comprising the interior of said third tubular means and the space between said third and fourth tubular means, another path including the inside of said second member and the outside of said fourth tubular means, and, f. second connecting means for connecting one of the paths defined by said third and fourth tubular means, said second stationary member with a different one of the fluid communicating means.

29. The invention set forth in claim 28 including:

a. adapter means disposed in said axially extending opening of said second shaft means and having first and second cavities to which said corresponding ends of said third and fourth tubular means are sealingly connected, respectively, b. said adapter means having generally radial holes leading to said cavities, respectively, to define separate fluid paths therethrough, c. said connecting means including a plurality of connecting elements, certain of said elements being connected to said raidal adapter holes.

30. The invention set forth in claim 29 including:

a. fifth tubular means substantially coaxial with and surrounding said fourth tubular means, said fifth tubular means having an end sealingly engaged with said adapter means, the outside of said fifth tubular means defining with the interior of said second shaft opening a fluid flow path for conducting selected fluidic substances, b. said second shaft means having a hole leading generally radially from said axial opening, one of said plurality of connecting elements being connected to said last mentioned hole.

31. The invention set forth in claim 30 wherein:

a. said fluid communicating means comprises tuyere means including first and second tubular elements extending to the interior of said vessel, said second element surrounding and being in spaced relationship with said first element whereby individual fluid flow paths are defined, and means for connecting said first and second tubular elements to two of said fluid paths established within said second shaft means.

32. In combination, a metallurgical vessel having pin means associated therewith to support said vessel for pivotal movement, said pin means having an axially extending opening, a stationary member coupled in rotational sealing engagement with said pin means, said stationary member having means defining a first passageway communicating with said axially extending opening in said pin means and having an inlet communicating with said first passageway, first tubular means and second tubular means surrounding said first means in spaced relation, said first and second tubular means extending through said stationary member and into said axial opening of said pin means to define first, second and third fluid flow paths, the first flow path being the inside of the first tubular means and the second flow path being the space between said tubular means, said second tubular means being spaced from said passageway and said axially extending opening to define said third fluid flow path, means sealing said tubular means for rotation within and relative to said stationary member, a swivel joint assembly having first and second inlets and first and second outlets, and independent flow path defining means therebetween, one of said outlets communicating with said first fluid flow path inside of said first tubular means and the other outlet communicating with said second fluid flow path between said tubular means, and means for connecting said first, second and third fluid paths to said vessel from within said pin means.

33. The combination set forth in claim 32 wherein said vessel has a refractory lining for containing molten metal, tuyere means extending through said lining for conducting fluid from the exterior to the interior of said vessel, and connecting means for connecting at least one of said fluid flow paths to said tuyere means.

34. The combination set forth in claim 33 wherein said vessel includes trunnion ring means affixed thereto, said pin means including a pair of trunnion pins extending from the opposite sides of said trunnion ring means, said axially extending opening being formed in one of said trunnion pins, a second one of said fluid flow paths being coupled to said trunnion ring means for conducting cooling fluid thereto, the third one of said fluid flow paths being coupled to said trunnion ring means for conducting cooling fluid therefrom.

35. The combination set forth in claim 34 wherein a second axial opening is formed in the second one of said trunnion pins, fourth tubular means extending into said second axial opening and a hollow means surrounding at least an intermediate portion of said fourth tubular means, said fourth tubular means being adapted to be connected for conducting a fluid to said tuyere means and for rotation with said vessel, said hollow means being stationary and having a gas inlet, means for effecting a rotational seal between said hollow means and said fourth tubular means to permit said vessel to rotate relative to said hollow means, said hollow means defining a fifth flow path to said vessel, swivel joint means coupled with said fourth tubular means, and rotational seal means between said hollow means and said fourth tubular means where the latter extends through said hollow means.

* * * * *

UNITED STATES PATENT OFFICE
CERTIFICATE OF CORRECTION

Patent No. 3,893,658                      Dated   July 8, 1975

Inventor(s)  Howard M. Fisher

It is certified that error appears in the above-identified patent and that said Letters Patent are hereby corrected as shown below:

Column 14, Claim 4, line 39, change "gasses" to --gases--;
    line 52, change "strem" to --stream--.

Column 15, Claim 6, line 50, change "therin" to --therein--.

Column 19, Claim 22, line 45, change "extrains" to --entrains--.

Column 20, Claim 25, line 40, change "thrid" to --third--.

Column 21, Claim 29, line 36, change "raidal" to --radial--.

Signed and Sealed this second Day of December 1975

[SEAL]

Attest:

RUTH C. MASON
*Attesting Officer*

C. MARSHALL DANN
*Commissioner of Patents and Trademarks*